(12) United States Patent
Arbuckle et al.

(10) Patent No.: US 12,454,341 B1
(45) Date of Patent: Oct. 28, 2025

(54) MARINE PROPULSION CONTROL SYSTEM, METHOD, AND USER INTERFACE

(71) Applicant: Brunswick Corporation, Mettawa, IL (US)

(72) Inventors: Jason S. Arbuckle, Horicon, WI (US); Brandon L. Tate, Walnut Hill, IL (US); Trevor George, Savoy, IL (US)

(73) Assignee: Brunswick Corporation, Mettawa, IL (US)

( * ) Notice: Subject to any disclaimer, the term of this patent is extended or adjusted under 35 U.S.C. 154(b) by 261 days.

(21) Appl. No.: 18/314,048

(22) Filed: May 8, 2023

(51) Int. Cl.
| | |
|---|---|
| *B63H 21/21* | (2006.01) |
| *B63B 49/00* | (2006.01) |
| *B63B 79/15* | (2020.01) |
| *B63B 79/40* | (2020.01) |
| *G05D 1/00* | (2006.01) |

(52) U.S. Cl.
CPC ............ *B63H 21/21* (2013.01); *B63B 49/00* (2013.01); *B63B 79/15* (2020.01); *B63B 79/40* (2020.01); *G05D 1/0206* (2013.01); *B63H 2021/216* (2013.01)

(58) Field of Classification Search
CPC .. B63H 21/21; B63H 2021/216; B63B 79/15; B63B 79/40; B63B 49/00; G05D 1/0206
See application file for complete search history.

(56) References Cited

U.S. PATENT DOCUMENTS

| | | | |
|---|---|---|---|
| 5,366,393 A * | 11/1994 | Uenage .................. | B63H 20/10 440/61 G |
| 8,417,399 B2 | 4/2013 | Arbuckle et al. | |
| 8,478,464 B2 | 7/2013 | Arbuckle et al. | |
| 9,771,137 B1 * | 9/2017 | Gable .................... | B63H 20/12 |
| 9,777,655 B1 * | 10/2017 | Arbuckle ............ | F02D 41/1401 |
| 9,904,293 B1 | 2/2018 | Heap et al. | |
| 9,908,606 B1 * | 3/2018 | Andrasko ............ | B63H 21/213 |
| 9,927,520 B1 | 3/2018 | Ward et al. | |
| 9,975,619 B1 * | 5/2018 | Gonring .................... | H02P 9/48 |
| 9,988,134 B1 * | 6/2018 | Gable .................... | B63B 79/40 |
| 9,994,296 B1 * | 6/2018 | Balogh .................. | B63B 79/10 |
| 10,259,555 B2 | 4/2019 | Ward et al. | |

(Continued)

OTHER PUBLICATIONS

Muhammad et al., Applications of Myo Armband Using EMG and IMU Signals, 2010, IEEE, p. 6-11 (Year: 2010).*

(Continued)

*Primary Examiner* — McDieunel Marc
(74) *Attorney, Agent, or Firm* — Andrus Intellectual Property Law, LLP

(57) ABSTRACT

A propulsion system for a marine vessel includes a plurality of marine drives configured to effectuate propulsion on the marine vessel and a control system. The control system is configured to determine a disturbance vector representing an environmental disturbance on the marine vessel and identify a propulsion response capability of the plurality of marine drives to oppose the disturbance vector. When a request is received to perform an autonomous action, the control system determines whether insufficient propulsion authority is available to perform the requested autonomous action based on the disturbance vector and the propulsion response capability and, if so, generates an insufficiency alert on a user interface to advise a user of the insufficient propulsion authority.

25 Claims, 7 Drawing Sheets

(56) References Cited

U.S. PATENT DOCUMENTS

| | | |
|---|---|---|
| 10,429,845 B2 | 10/2019 | Arbuckle et al. |
| 10,845,812 B2 | 11/2020 | Ward et al. |
| 11,327,494 B1 | 5/2022 | Arbuckle et al. |
| 11,702,178 B2 * | 7/2023 | Dannenberg .......... G05D 1/0206 701/21 |
| 12,043,359 B2 * | 7/2024 | Gonring ................ B63H 21/20 |
| 12,065,230 B1 * | 8/2024 | Derginer ............... B63H 20/12 |
| 2017/0253314 A1 | 9/2017 | Ward |
| 2020/0247518 A1 | 8/2020 | Dannenberg et al. |

OTHER PUBLICATIONS

Zhong et al., Design and realization of control system of humanoid robot, 2005, IEEE, p. 280-283 (Year: 2005).*

Park et al., EmPro: an Environment/Energy Emulation and Profiling Platform for Wireless Sensor Networks, 2011, IEEE, p. 158-167 (Year: 2011).*

Jeon et al., Robot Control Using an Underwater Acoustic Modem, 2010, IEEE, p. 331-336 (Year: 2010).*

* cited by examiner

MARINE PROPULSION CONTROL SYSTEM, METHOD, AND USER INTERFACE

FIELD

The present disclosure generally relates to marine propulsion control systems and methods, and more specifically to control and user interface systems and methods for engaging automatic propulsion control routines, such as for docking, launch, trailering, or other situations where steering and propulsion are automatically controlled.

BACKGROUND

The following U.S. patents are incorporated herein by reference, in entirety:

U.S. Pat. No. 10,259,555 discloses a method for controlling movement of a marine vessel near an object that includes accepting a signal representing a desired movement of the marine vessel from a joystick. A sensor senses a shortest distance between the object and the marine vessel and a direction of the object with respect to the marine vessel. A controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

U.S. Pat. No. 10,845,812 discloses a system for controlling movement of a marine vessel near an object. The system includes a control module in signal communication with a marine propulsion system, a manually operable input device providing a signal representing a requested translation of the marine vessel, and a sensor providing a first distance between the vessel and a first point on the object and a second distance between the vessel and a second point on the object. The control module determines an actual angle between the vessel and the object based on the first distance and the second distance. In response to the signal representing the requested translation, the control module stores the actual angle between the vessel and the object as an initial angle and controls the marine propulsion system to produce thrust that will carry out the requested translation and that will maintain the initial angle.

U.S. Pat. No. 11,327,494 discloses a method for maintaining a marine vessel propelled by a marine propulsion device in a selected position, including determining a current global position of the marine vessel and receiving a signal command to maintain the current global position. The current global position is stored as a target global position in response to receiving the signal command. A subsequent global position of the marine vessel is determined and a position error difference between the subsequent global position and the target global position is determined. The method includes determining marine vessel movements required to minimize the position error difference, and causing the marine propulsion device to produce a thrust having a magnitude, a direction, and an angle calculated to result in achievement of the required marine vessel movements. At least one of timing and frequency of discontinuity of thrust production is controlled while the position error difference is minimized.

U.S. Patent Pub. No. 2020/0247518 discloses a marine propulsion system that includes at least one propulsion device and a user input device configured to facilitate input for engaging automatic propulsion control functionality with respect to a docking surface, wherein the user input device includes a direction indicator display configured to visually indicate a direction with respect to the marine vessel. A controller is configured to identify a potential docking surface, determine a direction of the potential docking surface with respect to the marine vessel, and control the direction indicator display to indicate the direction of the potential docking surface with respect to the marine vessel. When a user selection is received via the user input device to select the potential docking surface as a selected docking surface, and propulsion of the marine vessel is automatically controlled by controlling the at least one propulsion device to move the marine vessel with respect to the selected docking surface.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one aspect of the present disclosure, a propulsion system for a marine vessel includes a plurality of marine drives configured to effectuate propulsion on the marine vessel and a control system. The control system is configured to determine a disturbance vector representing an environmental disturbance on the marine vessel and identify a propulsion response capability of the plurality of marine drives to oppose the disturbance vector. When a request is received to perform an autonomous action, the control system determines whether sufficient propulsion authority is available to perform the requested autonomous action based on the disturbance vector and the propulsion response capability and, if not, generates an insufficiency alert on a user interface to advise a user of the insufficient propulsion authority.

In one embodiment, the disturbance vector includes a force, velocity, and/or acceleration of the environmental disturbance.

In another embodiment, the propulsion response capability includes a maximum force, a maximum velocity, and/or a maximum acceleration that the plurality of marine drives can effectuate to move the marine vessel in a direction opposite a direction of at least a portion of the disturbance vector.

In another embodiment, the control system is further configured to control the plurality of marine drives based on a modified autonomous action, wherein the modified autonomous action includes controlling the plurality of marine drives to maintain a position of the marine vessel.

In another embodiment, the control system is further configured to control the plurality of marine drives based on a modified autonomous action, wherein the modified autonomous action includes controlling the plurality of marine drives to move the marine vessel to a location and/or heading where the propulsion response capability is sufficient to maintain a position of the marine vessel.

In a further embodiment, the control system is configured to determine whether sufficient propulsion authority is available to maintain the vessel position, such as within a threshold of the current GPS position of the vessel. Optionally, the control system is configured to assess propulsion sufficiency based on whether the propulsion response capability is sufficient to maintain the marine vessel within a threshold distance range of its current GPS position. If so, then the control system enters a position keeping mode to maintain the current vessel position; if not then the plurality of marine drives are controlled to adjust the position and/or heading of the marine vessel until sufficient propulsion authority is available to maintain the vessel position.

In another embodiment, the control system is further configured to control the plurality of marine drives based on a modified autonomous action, wherein the modified autonomous action includes controlling the plurality of marine drives to maintain at least a buffer distance from objects around the marine vessel.

In another embodiment, the control system is further configured to control the plurality of marine drives based on a modified autonomous action, wherein the modified autonomous action includes controlling the plurality of marine drives based on the requested autonomous action while displaying the insufficiency alert.

In another embodiment, the control system is further configured to determine a disturbance frequency of the environmental disturbance on the marine vessel and identify a propulsion response frequency of the plurality of marine drives, wherein determining that insufficient propulsion authority is available is further based on a comparison of the disturbance frequency and the propulsion response frequency.

In another embodiment, the control system is further configured to identify a direction of propulsion required to execute the requested autonomous action, wherein determining that insufficient propulsion authority is available is further based on a comparison of the direction of propulsion to a direction of at least a portion of the disturbance vector.

In a further embodiment, the requested autonomous action is a command to autonomously control propulsion to dock the marine vessel against a selected docking surface, and wherein the direction of propulsion is a direction of the selected docking surface with respect to the marine vessel.

In another aspect of the present disclosure, a method of controlling propulsion by a plurality of marine drives on a marine vessel includes determining a disturbance vector representing an environmental disturbance on the marine vessel and identifying a propulsion response capability of the plurality of marine drives to oppose the disturbance vector. When an autonomous action is requested, it is determined whether insufficient propulsion authority is available to perform the requested autonomous action based on the disturbance vector and the propulsion response capability. If insufficient propulsion authority is available, an insufficiency alert is generated on a user interface to advise a user of the insufficient propulsion authority.

In one embodiment the method further includes, upon determining that insufficient propulsion authority is available, controlling the plurality of marine drives based on a modified autonomous action. Optionally, modified autonomous action includes controlling the plurality of marine drives to maintain a position of the marine vessel, controlling the plurality of marine drives to maintain at least a buffer distance from objects around the marine vessel, controlling the plurality of marine drives to move the marine vessel to a location and/or heading where the propulsion response capability is sufficient to maintain a position of the marine vessel, and/or controlling the plurality of marine drives based on the requested autonomous action, or a portion thereof, while displaying the insufficiency alert.

In one embodiment, the disturbance vector includes a force, velocity, and/or acceleration of the environmental disturbance.

In another embodiment, the propulsion response capability includes a maximum force, a maximum velocity, and/or a maximum acceleration that the plurality of marine drives can effectuate to move the marine vessel in a direction opposite a direction of at least a portion of the disturbance vector.

In another embodiment, the method further includes determining a disturbance frequency of the environmental disturbance on the marine vessel and identifying a propulsion response frequency of the plurality of marine drives, wherein determining that insufficient propulsion authority is available is further based on a comparison of the disturbance frequency and the propulsion response frequency.

In another embodiment, the method further includes identifying a direction of propulsion required to execute the requested autonomous action, wherein determining that insufficient propulsion authority is available is further based on a comparison of the direction of propulsion to a direction of at least a portion of the disturbance vector.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
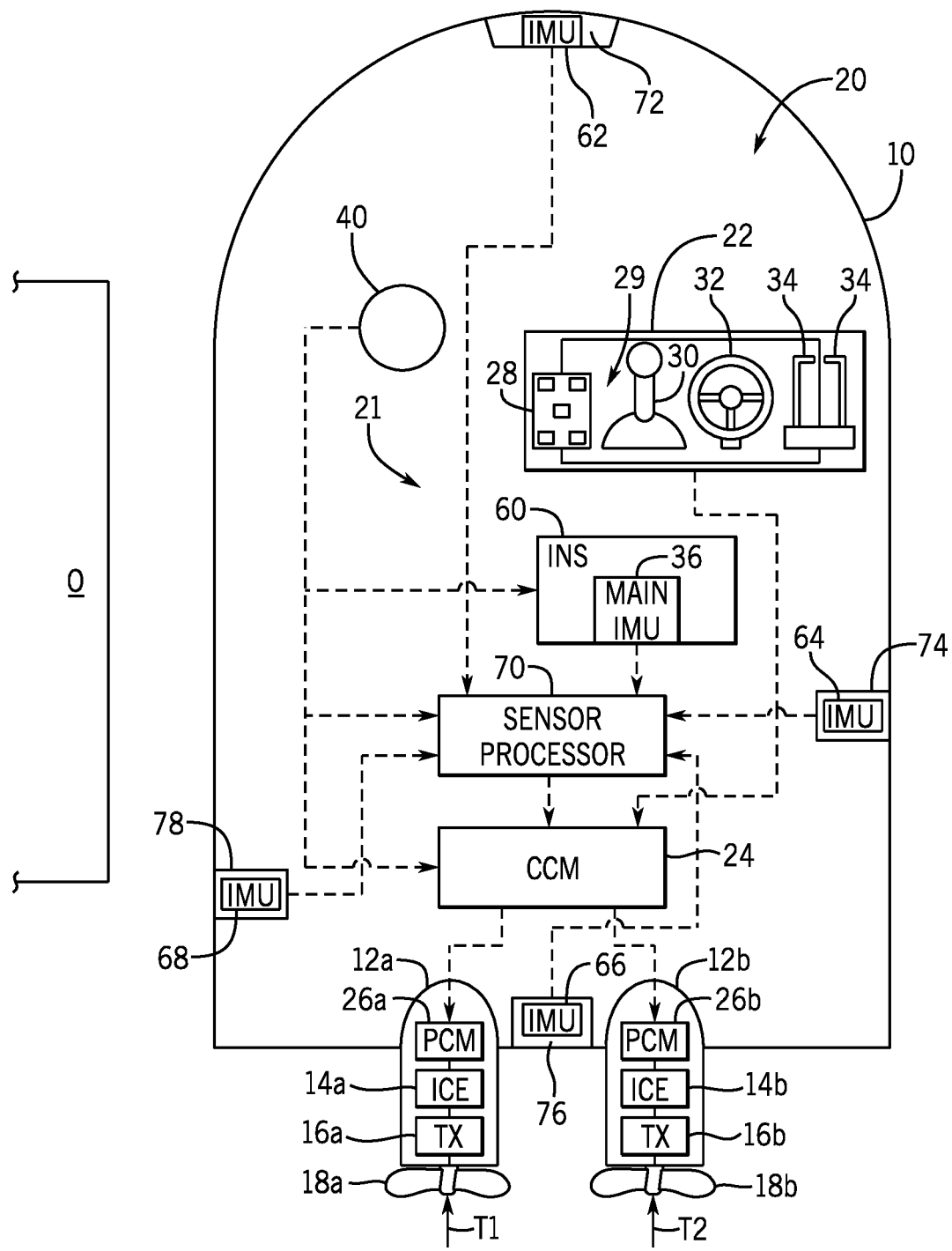
FIG. 1 is a schematic representation of an exemplary propulsion system on a marine vessel.

The present inventors have recognized that marine environmental factors exert harsh and changing forces on a marine vessel 10 that can, in certain circumstances, exceed the capabilities of a propulsion system on a marine vessel. Thus, marine propulsion systems may not be capable of producing sufficient thrust or effectuating a sufficient response frequency to execute certain maneuvers in harsh sea conditions where environmental conditions present forces on the marine vessel that overwhelm the capabilities of the propulsion system. Marine propulsion systems have maximum output capabilities defined by the marine drives in the system, as well as by hull shape and size and other vessel dynamics factors. The maximum output capabilities typically vary depending on the propulsion direction. For example, the propulsion system is typically most efficient and capable of moving the vessel in the forward surge direction—i.e., it can effectuate the most thrust with the greatest efficiency and achieve the highest vessel velocity in the forward direction. Typically, propulsion systems are also configured to exert significant reverse forces to move the vessel in the backward direction, though the reverse thrust capabilities are typically less than the forward capabilities due to reverse thrust limits resulting from propeller and exhaust designs (e.g., cavitation and ventilation issues), the configuration and maximum holding force of the trim system, hull dynamics, etc.

Multi-drive propulsion systems configured for joysticking and other lateral movement capabilities typically have a different maximum propulsion output capability in each of the surge, sway, and yaw directions. Typically, the sway (sideways) direction is the most limited, which is a factor of the above-described reverse thrust limits, the hull dynamics—e.g., the amount of resistance the vessel incurs when moved sideways and the inefficiencies of effectuating sideways propulsion utilizing steering-limited marine drives at the rear of the vessel. For rear-mounted drives that are not steerable to 90 degrees, rear thrust is typically effectuated by splaying one or more pairs of drives such that their surge (forward/reverse) and yaw (rotational) forces cancel and just a sway thrust results. Thus, significant thrust output exerted by both drives is wasted due to the need to cancel out unwanted thrust vectors.

Environmental disturbances in the marine environment, such as current, wind, and waves, can occur at levels where the marine propulsion system cannot react quickly enough or exert enough force to properly execute autonomous maneuvers, such as autonomous propulsion control for docking, trailering, launch, or on-plane control. For example, the propulsion system may not be able to accurately execute a docking maneuver to dock a vessel sideways against a dock where heavy wind and/or current exert a stronger force that equals or exceeds the lateral propulsion output capability of the propulsion system. As another example, where the frequency, magnitude, and/or direction of waves are imparting maximum forces on the marine vessel that exceed the capabilities of the propulsion system in that direction or are imparting force changes on the vessel that exceed a response time of the propulsion system such that the control system cannot sufficiently control the vessel's heading or position, the propulsion system may not be able to accurately execute a docking maneuver to dock a vessel against a dock.

In view of the foregoing challenges, the inventors have recognized that it would be beneficial for autonomous marine propulsion control systems to assess whether the propulsion system is capable of carrying out a requested autonomous maneuver before executing or attempting execution of that maneuver. The disclosed systems and methods measure and/or estimate certain aspects of the marine environment and determine whether sufficient propulsion authority exists to execute a requested autonomous action, or whether the requested autonomous maneuver will require propulsion response times or propulsion output forces that are beyond the capability of the propulsion system. The requested autonomous action may be, for example, user input to engage an autonomous mode, such as autonomous docking or autonomous trailering, where the propulsion control system automatically controls propulsion based on proximity measurements and/or vision system inputs. As another example, the requested autonomous action may be a command to dock the marine vessel, which may be a user-inputted command or a command from an autonomous propulsion controller based on a pre-set autonomous propulsion control routine.

When an autonomous action is requested, the propulsion control system determines whether sufficient authority exists to perform the requested action. If not, then an insufficiency alert is generated and a modified autonomous action is executed, which may include asking for additional user input, executing a different autonomous action, executing the requested autonomous action to the extent possible while displaying an insufficiency alert, and/or automatically activating another mode such as station keeping or object avoidance. In an embodiment where the requested autonomous action is a user command to engage an autonomous mode, for example, upon determining that insufficient propulsion authority exists to engage the autonomous mode, the control system will not engage the commanded autonomous mode and control the user interface to generate an alert advising the user that the commanded autonomous mode is not engaged.

The propulsion control system is configured to determine a disturbance vector representing an environmental disturbance exerting a force on the marine vessel, such as current, wind, and/or waves. The disturbance vector includes a magnitude and a direction, which may include a surge, sway, and yaw directional component. The disturbance vector is compared to a propulsion response capability of the propulsion system to generate an opposing thrust. In certain embodiments, the propulsion control system may also be configured to determine a disturbance frequency or rate of change of the environmental disturbance on the marine vessel. A propulsion response frequency of the propulsion system is identified which indicates how long it takes for the plurality of marine drives to reach or effectuate the maximum propulsion response output. In such an embodiment, the determination of whether sufficient propulsion authority exists is further based on a comparison of the disturbance frequency to the propulsion response frequency.

The propulsion control system may be further configured to identify a direction of propulsion required to execute the requested autonomous action and compare the direction of propulsion to a direction of at least a portion of the disturbance vector to assess the impact of the disturbance vector on performing the autonomous action. Where execution of the autonomous action does not require propulsion to directly oppose the disturbance vector, such as requiring propulsion in a direction normal or tangential to the disturbance vector, then the impact of the disturbance vector may be weighted accordingly. Thereby, the propulsion control system can predict the impact of the environmental disturbance(s) on performance of a requested autonomous action and advise an operator accordingly and/or control the vessel in the safest way given the environmental circumstances and the limits of the propulsion system.

FIG. 1 shows a marine vessel 10 equipped with a propulsion system 20 configured according to one embodiment of the disclosure. The propulsion system 20 is capable of operating, for example, in a joysticking mode where a joystick is operated by an operator to control vessel movement in the surge, sway, and yaw directions within an x/y plane, among other modes, as described hereinbelow. The propulsion system 20 includes a plurality of marine drives, which in this example includes first and second marine drives 12a, 12b that produce first and second thrusts T1, T2 to propel the vessel 10. The first and second marine drives 12a, 12b are illustrated as outboard drives, but they could alternatively be inboard motors, stern drives, jet drives, or pod drives. Alternatively or additionally, the propulsion system 20 may include one or more thrusters, such as a bow thruster and/or one or more stern thrusters, which may be steerable or fixed. Each marine drive is provided with a powerhead 14a, 14b, such as an internal combustion engine or an electric motor, operatively connected to a transmission 16a, 16b, in turn, operatively connected to effectuate rotation of a propeller 18a, 18b. Alternatively, the powerhead 14a, 14b may be configured to directly drive rotation of the propeller without connection through a transmission or other gear system.

The propulsion system 20 also includes control elements that comprise part of the control system 21. The control system 21 comprises an operation console 22 in signal communication, for example via a CAN bus, with one or more controllers 24, such as for example a command control module (CCM), and with propulsion control modules (PCM) 26a, 26b associated with the respective marine drives 12a, 12b. However, this control arrangement is merely exemplary and the control system 21 may be implemented with additional and/or different controller arrangements in alternate configurations capable of performing the control functions and methods described herein. Each of the controller 24 and the PCMs 26a, 26b may include a memory and a programmable processor. As is conventional, each controller 24, 26a, 26b includes a processor communicatively connected to a storage system comprising a computer-readable medium that includes volatile or nonvolatile memory upon which computer-readable code and data is stored. The processor can access the computer-readable code and, upon executing the code, carry out functions, such as the navigation control functions and/or the proximity sensing functions, as described herein.

The operation console 22 includes a number of user interface devices, such as a keypad 28, a joystick 30, a steering wheel 32, and one or more throttle/shift levers 34. The operation console 22 may further include a display 29, such as may be associated with an onboard management system, that is configured to visually present information to the operator (e.g., information regarding control mode, control settings), present control options to the operator, and receive user input from the operator in response to the control options. One example of such a display system is VesselView by Mercury Marine Company of Fond du Lac, Wisconsin. Each of these devices inputs commands to the controller 24. Controller 24, in turn, communicates control instructions to the first and second marine drives 12a, 12b by communicating with the PCMs 26a, 26b. The steering wheel 32 and the throttle/shift levers 34 function in a conventional manner such that rotation of the steering wheel 32, for example, activates a transducer that provides a signal to the controller 24 regarding a desired direction of the vessel 10. The controller 24, in turn, sends signals to the PCMs 26a, 26b (and/or TVMs or additional modules if provided), which in turn activate steering actuators to achieve desired orientations of the marine drives 12a, 12b. The marine drives 12a, 12b are independently steerable about their steering axes. The throttle/shift levers 34 send signals to the controller 24 regarding the desired gear (forward, reverse, or neutral) of the transmissions 16a, 16b and the desired rotational speed of the powerheads 14a, 14b of the marine drives 12a, 12b. The controller 24, in turn, sends signals to the PCMs 26a, 26b, which in turn activate electromechanical actuators in the transmissions 16a, 16b and powerheads 14a, 14b for shift and throttle, respectively. A manually operable input device, such as the joystick 30, can also be used to provide control input signals to the controller 24. The joystick 30 can be used to allow the operator of the vessel 10 to manually maneuver the vessel 10, such as to achieve lateral translation or rotation of the vessel 10.

The control system 21 also includes or is in signal communication with one or more proximity sensors 72, 74, 76, and 78 and/or a sensor processor 70. Although one proximity sensor is shown on each of the bow, stern, port and starboard sides of the vessel 10, fewer or more sensors could be provided at each location and/or provided at other locations, such as on the hardtop of the vessel 10. The proximity sensors 72-78 are distance and directional sensors. For example, the sensors could be radars, sonars, cameras, lasers (e.g. lidars or Leddars), Doppler direction finders, or other devices individually capable of determining both the distance and direction (at least approximately), i.e. the relative position of an object O with respect to the vessel 10, such as a dock, a seawall, a slip, another vessel, a large rock or tree, etc. The sensors 72-78 provide information regarding both a direction of the object with respect to the marine vessel 10 and a shortest distance between the object O and the vessel 10. Alternatively, separate sensors could be provided for sensing direction than are provided for sensing distance, or more than one type of distance/direction sensor can be provided at a single location on the vessel 10. The sensors 72-78 provide this distance and/or direction information to one or more controllers, such as to the sensor processor 70 and/or the CCM 24, such as by way of a dedicated bus connecting the sensors to a controller, a CAN bus, or wireless network transmissions, as described in more detail below.

Regarding the proximity sensors, 72, 74, 76, 78, note that different types of sensors may be used depending on the distance between the vessel 10 and the object O. For example, radar sensors may be used to detect objects at further distances. Once the vessel 10 comes within a particular distance of the object, lidar, ultrasonic, Leddar, or sonar sensors may instead be used. Camera sensors may be used, alone or in combination with any of the sensors mentioned above, in order to provide object proximity information to the CCM 24. Sensors are placed at positions on the vessel 10 so that they are at the correct height and facing direction to detect objects the vessel 10 is likely to encounter. Optimal sensor positions will vary depending on vessel size and configuration.

In FIG. 1, the proximity sensors are positioned at each of the front, sides, and stern of the vessel 10, and include front-facing sensor 72, starboard-facing sensor 74, rear-facing sensor 76, and port-facing sensor 78. In a different exemplary sensor arrangement, two proximity sensors may be placed on the hard top of the marine vessel 10 and arranged such that the fields of view of the two sensors, combined, cover the entire 360° area surrounding the vessel 10. Note also that the relevant controller, such as the sensor processor 70, may selectively operate any one or more of a plurality of sensors (including radars, lidars, Leddars, ultrasonics, and cameras) to sense the shortest distance and the direction of the object with respect to the vessel 10. Alternatively, the sensor processor may use all available sensor data from all sensor types, which may be reviewed real-time as it is received or may be formulated into one or more maps or occupancy grids integrating all proximity measurement data, where the mapped data from all the operated sensors is processed as described herein. In such an embodiment, the proximity measurements from each of the various sensors are all translated into a common reference frame.

Autonomous controls, including advanced operator assistance (i.e., semi-autonomous) controls, for improved vessel handling qualities requires placement of multiple proximity sensors on the vessel 10. In general, these various types of proximity sensing devices (examples described above) are positioned to detect the presence of objects in the marine environment surrounding the marine vessel 10, such as a dock, swimmer, or other obstruction in the path of the vessel. Each sensor reports proximity relative to its own frame of reference—i.e. the distance from the sensor to the object as measured along the view angle of the sensor. Depending on the type of sensor, the application of use, boat size, hull shape, etc., multiple sensor types and sensor locations may be required to provide adequate proximity sensing around the marine vessel 10 for operation in all marine environments. To create a cohesive dataset that can be used for purposes of vessel control and vessel navigation, including autonomous vessel navigation and semi-autonomous control (such as automatic maneuver-limiting control), all of the data sources are preferably translated to a common reference frame. This requires precise knowledge of the location and orientation of each sensor relative to the common reference frame such that the data measured therefrom can be translated appropriately.

In the example of FIG. 1, a main inertial measurement unit (IMU) 36 is installed at a known location on the marine vessel with respect to a predefined point of navigation, such as the center of rotation (COR) or center of gravity (COG). The installation orientation or the main IMU 36 is also known. The installation locations of the main IMU 36 and each proximity sensor 72-78 may be established as part of a calibration procedure for the proximity sensing system.

Referencing the example in FIG. 1, the main IMU 36 may be part of an inertial navigation system (INS) such as including one or more micro-electro-mechanical systems (MEMS) configured to sense motion and/or angular position of the vessel. For example, the INS 60 may consist of a MEMS angular rate sensor, such as a rate gyro, a MEMS accelerometer, and a magnetometer. Such INS systems are well known in the relevant art, as are other motion sensing systems. In other embodiments, the motion and angular position (including pitch, roll, and yaw) may be sensed by a differently configured INS 60, or by an attitude heading reference system (AHRS) that provides 3D orientation of the marine vessel 10 by integrating gyroscopic measurements, accelerometer data, and magnetometer data.

The INS 60 receives orientation information from the main IMU 36 and may also receive information from a GPS receiver 40 comprising part of a global positioning system (GPS). The GPS receiver 40 is located at a pre-selected fixed position on the vessel 10, which provides information related to global position of the marine vessel 10.

In FIG. 1 an IMU 62-68 is co-located with each proximity sensor 72-78. These sensor IMUs 62-68 may be configured similarly to the main IMU, such as each comprising a rate gyro, an accelerometer, and a magnetometer and producing corresponding IMU data. The IMU data from each sensor IMU 62-68 may be used for various purposes, such as for automatic calibration and verification of the proximity sensor system, for angular measurements used to interpret the proximity measurements by the relevant proximity sensor 72-78, and/or as backup IMUs in case of fault or failure of the main IMU 36.

The control system 21 is configured to utilize input from the proximity sensors 72-78 to detect and avoid colliding with obstacles. The control system may be configured to set a maximum vessel velocity or maximum vessel acceleration that can be realized where the control system has the ability to avoid colliding with known obstacles. The acceleration limit is the maximum acceleration a vessel can reach for both speeding up and slowing down, where maximum deceleration of a marine vessel is accomplished by effectuating a maximum thrust output opposite the vessel's direction of travel. The propulsion control system and method may further be configured to execute an object avoidance routine that maintains a buffer distance around the marine vessel, where the control authority provided to an operator is limited based on object proximity so as to maintain the buffer distance. For example, in an object avoidance mode the propulsion control system may continuously calculate a maximum velocity, or velocity limit, for the marine vessel as it approaches an object O and may limit an operator's authority in controlling propulsion of the marine vessel 10 such that the propulsion system will not effectuate a thrust that will cause the marine vessel to travel toward the object at a velocity that is greater than the velocity limit. Thus, the propulsion system does not respond to, or carry out, commands that would cause the vessel to violate the buffer distance and venture too close to an object.

In an autonomous object avoidance mode, the control system 21 may be configured to automatically maintain a predetermined buffer distance between the marine vessel 10 and one or more objects O, such as to automatically effectuate propulsion controls to force the marine vessel 10 away from an object O when the buffer zone is violated. The control system 21 may be configured to measure all directions around the marine vessel and to calculate a velocity limit toward objects in multiple directions so as to avoid hitting objects in the area around the vessel. For example, velocity limits in each of the positive and negative surge, sway, and yaw directions may be calculated based on detected objects in the marine environment around the vessel, as well as based on engaged control modes, etc.

Figure 2:
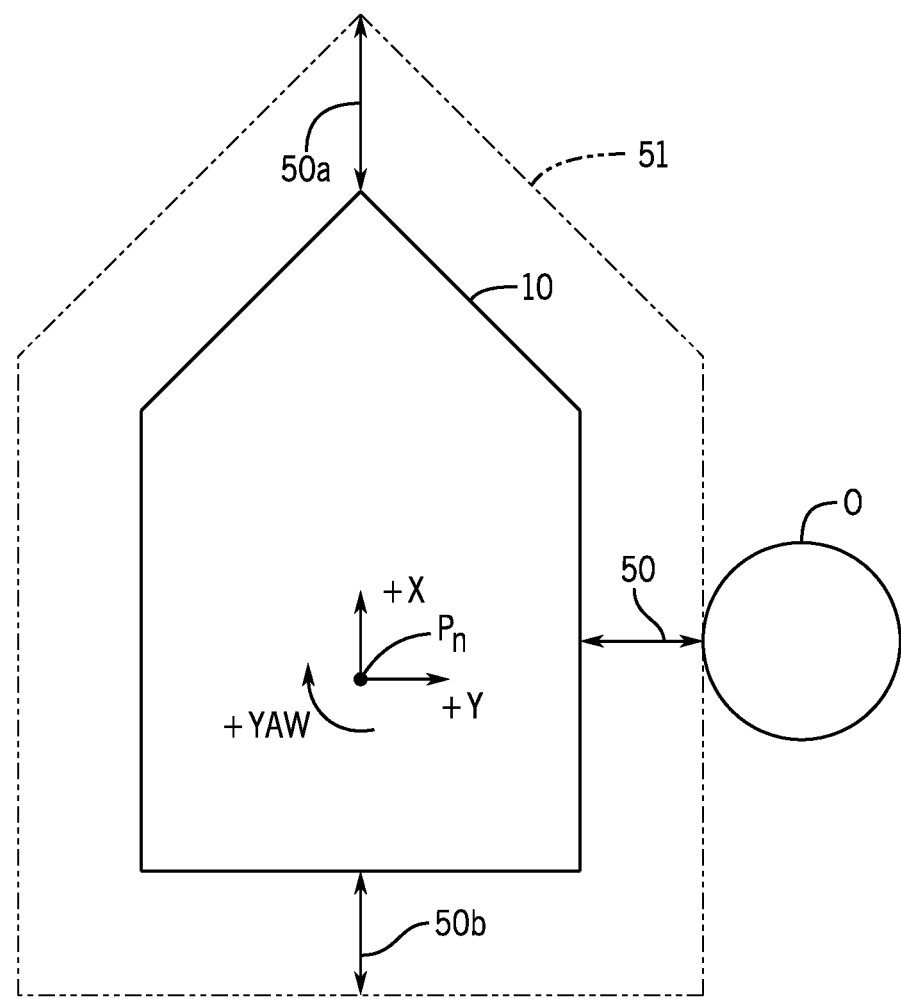
FIG. 2 schematically illustrates one implementation of a buffer distance maintained between a marine vessel and an object according to one embodiment of the present disclosure.

FIG. 2 is a diagram exemplifying this concept, where the marine vessel 10 is maintained at least the predetermined buffer distance 50 from the object O. A buffer zone 51 around the marine vessel 10 is defined, and velocity limits are calculated to progressively decrease the vessel velocity as it approaches the preset buffer distance 50 from the object O. In the depicted embodiment, the buffer zone 51 is established at a preset buffer distance 50 that is equal around all sides of the marine vessel. In certain embodiments, the buffer zone 51 may be asymmetrical with respect to the marine vessel, such as to provide a greater buffer distance 50a at the front side of the marine vessel than the buffer distance 50b on the rear side of the marine vessel. Similarly, a buffer distance on the starboard and port sides of the marine vessel 10 may be set the same or different than the front and rear buffer distances 50a, 50b.

The control system 21 provides autonomous control of the propulsion system so as to navigate the marine vessel 10 in tight spaces, such as during docking, launch, and trailering. The inventors have recognized that docking a marine vessel is a challenging task, especially with external factors common in marine environments, such as wind, waves, and current. Accordingly, the inventors have recognized that autonomous control may be beneficial for certain marine vessel control tasks, especially those tasks requiring high visibility at all points around the marine vessel and/or precise propulsion control. Docking and launch are prime examples of such tasks because they require precise propulsion control in variable environmental conditions, and because operators standing at the helm typically do not have good visibility at important points of the marine vessel, such as near the corners and along the exterior sides of the gunnels on the marine vessel. Trailering and other procedures requiring vessel maneuvering in tight spaces may be equally challenging and thus autonomous modes and control software have been developed to utilize the proximity sensing system to determine and execute optimal propulsion control routine autonomously.

However, the inventors have recognized that marine environments sometimes present disturbance forces, such as due to current, wind, and/or waves that make such autonomous control more difficult. Where the environmental disturbance is greater than the propulsion capability of the propulsion system 20, or even where the disturbance magnitude or frequency is at or near the propulsion capability of the marine drives 12a and 12b, insufficient propulsion authority exists such that the environmental factors are likely to overwhelm the propulsion system and the desired autonomous action cannot be accurately executed. For example, the autonomous or semi-autonomous control algorithms, such as effectuated by the controller 24, include control software performing algorithms to calculate an appropriate velocity or velocity range for the marine vessel 10 as it approaches an object O for docking against it. If the disturbance vector representing an effect of one or more environmental disturbances on the marine vessel, such as current or wind, is in a direction opposing the appropriate or desired velocity such that the vessel will not make headway toward the docking object O, or the propulsion system 20 operating at its maximum response capability will not be able to maintain a velocity within the acceptable velocity range, then the control system 21 may determine that insufficient propulsion authority exists to perform the requested autonomous action.

Figure 3:
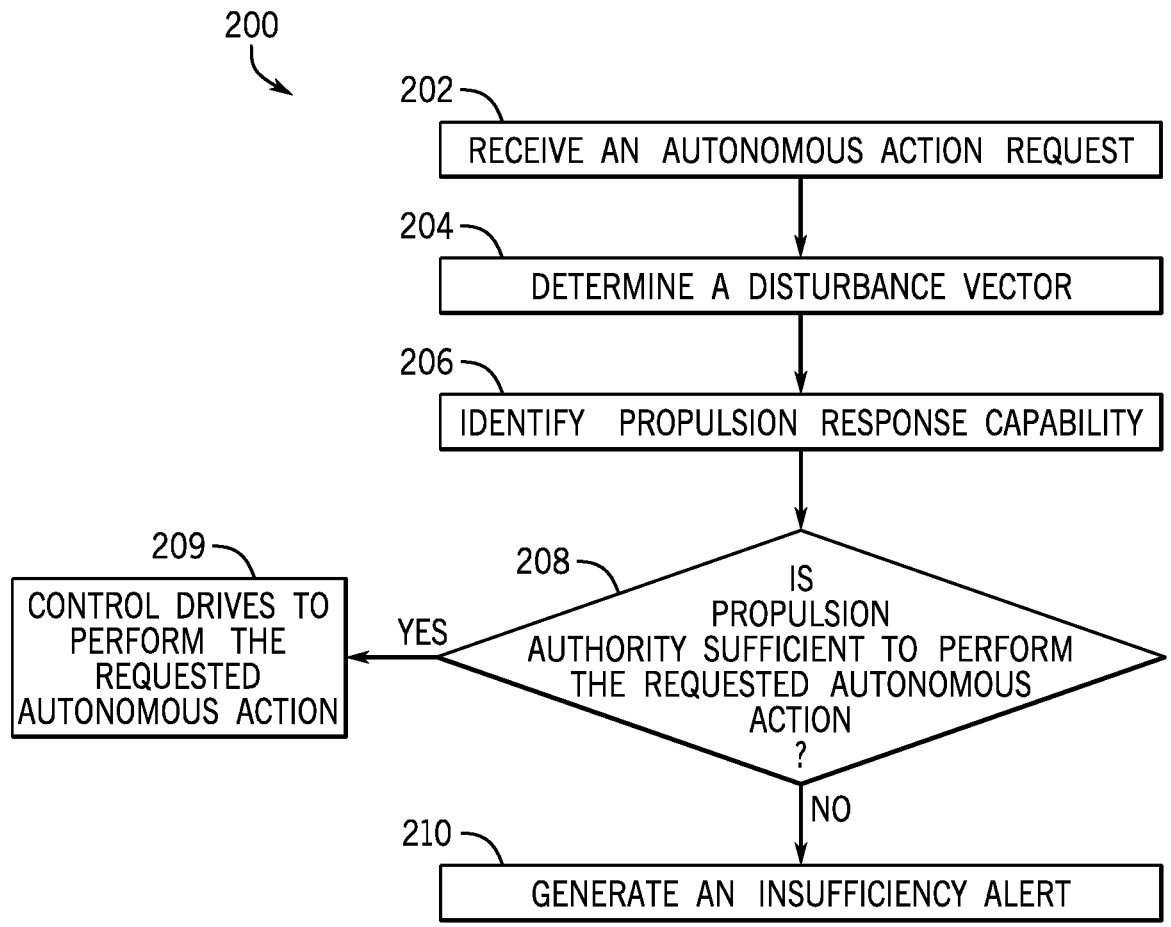
FIG. 3 illustrates one embodiment of a method for controlling propulsion of a marine vessel that includes assessing propulsion sufficiency for performing a requested autonomous action.

FIG. 3 depicts a propulsion control method 200 that includes exemplary steps for determining whether sufficient propulsion authority is available to execute a requested autonomous action. A request is received at step 202 to execute an autonomous action. The requested autonomous action may be, for example, user input via one of the user interface devices at the operation console 22 to engage an autonomous mode, such as autonomous docking or autonomous trailering, where the propulsion control system automatically controls propulsion based on proximity measurements and/or vision system inputs. As another example, the requested autonomous action may be a command to dock the marine vessel against a selected docking surface, which may be a user-inputted command or a command from an autonomous propulsion controller based on a pre-set autonomous propulsion control routine.

A disturbance vector is determined at step 204 representing the effect of one or more environmental disturbances, such as current, wind, and/or waves, on the marine vessel 10. For example, the disturbance vector may include a force, velocity, and/or acceleration of the environmental disturbance, including a magnitude and direction of impact on the marine vessel 10. The disturbance vector may represent just one disturbance factor to be accounted for, such as just current or just wind. In other embodiments, the system may determine a net disturbance vector representing a sum of a plurality of disturbance factors, such as including two or more of current, wind, and waves. The environmental disturbance may be measured, such as based on input from one or more of a motion sensor (e.g., IMU, INS, etc.) configured to sense motion of the marine vessel, a GPS receiver, and/or at least one environmental sensor on the marine vessel configured to sense an environmental force (such as current or wind). For example, the system may be configured to estimate the disturbance based on input from a motion sensor (e.g., IMU, INS, etc.) when no propulsion output is provided and thus the only forces on the vessel are environmental. Alternatively or additionally, environmental sensor(s), GPS, weather information, and/or other information sources may be utilized to estimate the disturbance vector.

The environmental sensor(s) on the vessel may include, for example, a pitot tube or paddle wheel positioned below the waterline and configured to measure a water speed with respect to the vessel and/or positioned above the waterline (such as on a top portion of the vessel) and configured to measure a wind speed with respect to the vessel. The current speed and direction and/or wind speed and direction can then be determined by subtracting the vessel speed and direction. In some embodiments, accurate current speed and direction determinations while the vessel is underway may require measuring water and wind speed when the vessel is traveling in two or more different directions so that the magnitude and direction of the current and wind can be accurately identified. Alternatively or additionally, the environmental disturbance may be determined based on weather information, such as based on information from on-board or on-shore weather stations, NOAA broadcasts, or other transmitted weather information. Alternatively or additionally, the environmental disturbance may be determined based on tide information, such as tide charts and date/time information. In some embodiments, the control system 21 may be configured to continually determine and monitor the disturbance vector, and thus step 104 does not necessarily follow receipt of an autonomous action request.

The propulsion response capability of the plurality of marine drives is identified at step 206, and particularly the capability of the propulsion system to oppose the disturbance vector. The propulsion response capability is determined and stored in units that correspond to the disturbance vector such that the values can be compared. For example, the propulsion response capability may include a maximum force, a maximum velocity, and/or a maximum acceleration that the plurality of marine drives 12a and 12b in the propulsion system 20 can effectuate to move the marine vessel 10 in a direction opposite a direction of the disturbance vector or at least a vector portion thereof. For example, the control system may store propulsion performance parameters that are used to gauge propulsion response capability, such as predefined or calibrated values stored upon configuration of the propulsion system. For example, a calibration routine may be performed at installation or periodically on a marine vessel to ascertain the propulsion output magnitudes and response periods in each of a plurality of predetermined directions (e.g., at least the surge, sway, and yaw directions). Alternatively or additionally, the propulsion output magnitudes and propulsion response periods in each of the plurality of predetermined directions may be learned and updated over time as the vessel is operated. The predetermined, calibrated, and/or learned propulsion output magnitude and propulsion response frequency values may be stored with respect to propulsion direction, such as in a table, and utilized for determining the relevant propulsion response capability of the propulsion system.

Logic is then executed at step 208 to determine whether sufficient propulsion authority exists to perform the requested autonomous action, including comparing the relevant impact of the disturbance vector and the response capability of the propulsion system. For example, the control system may identify a direction of propulsion required to execute the requested autonomous action and compare that direction of propulsion to the direction of the disturbance vector to assess the relevant magnitude of impact on vessel propulsion. The response capability of the propulsion system is then assessed accordingly to determine whether sufficient propulsion authority is available to counteract the impact of the environmental disturbance.

If sufficient propulsion authority exists, then the control system 21 moves to step 209 and controls the plurality of marine drives 12a and 12b to perform the requested autonomous action. If, however, sufficient propulsion authority is not available, then an insufficiency alert is generated at step 210 via one or more of the user interface devices, such as at the operation console 22, to advise a user of the insufficient propulsion authority. The insufficiency alert may be a visual and/or auditory alert advising the user that the propulsion system is insufficient to perform the requested autonomous action given the environmental disturbance. For example, the insufficiency alert may be provided via the display 29, such as displaying a visual alert advising of and/or explaining the insufficiency. Alternatively or additionally, the insufficiency alert may be provided via the joystick, keypad, or any device utilized by the user to input a request to engage/perform the autonomous action, such as by flashing or vibrating the joystick or relevant button on the keypad though which the input command was provided to indicate that the commanded mode or autonomous action will not be performed or will be performed in a reduced capacity or with reduced accuracy. The insufficiency alert may be accompanied by additional warnings, requests for input, and/or advisement regarding a modified autonomous action being performed by the propulsion system 20 in view of the insufficiency, such as to autonomously move the vessel to a location and/or heading where the propulsion response capability is adequate to maintain a position of the marine vessel.

As described above, the control system 21 may be configured to provide certain automatic propulsion control functionality, or autonomous modes, where the system automatically controls propulsion based on proximity measurements by the proximity sensors 72-78, such as to autonomously navigate the marine vessel during docking (i.e., autonomous docking) and launch (i.e., autonomous launch) maneuvers with respect to a docking surface. Likewise, the control system 21 may be equipped with software and functionality for autonomous trailering, such as via the systems and methods described at U.S. Pat. No. 9,904,293, which is hereby incorporated by reference in its entirety. Other autonomous modes, such as on-plane and launch control are also known.

Figure 4:
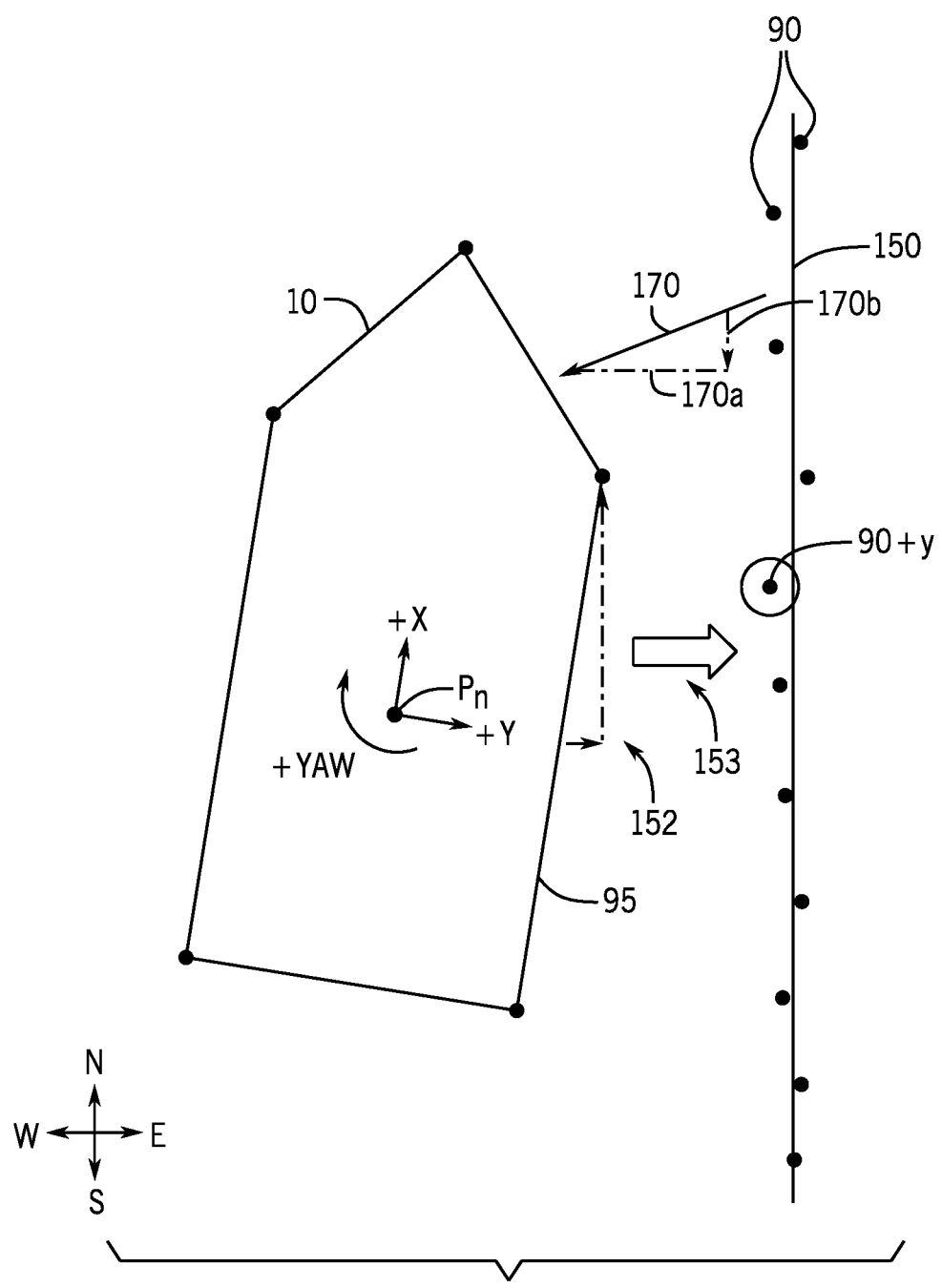
FIG. 4 illustrates in an autonomous docking scenario and control assessment according to the present disclosure.

FIG. 4 illustrates the disclosed methods and systems for capability and propulsion sufficiency assessments of requested autonomous actions with respect to exemplary autonomous docking control functionality. The control system 21 is configured to receive a user instruction to engage an autonomous docking mode and/or to perform a particular autonomous docking action, such as to dock the marine vessel against a selected docking surface. In certain embodiments, the control system 21 may be configured to identify a docking surface based on user input, such as a user input commanding autodocking and selecting a docking surface on a user interface element, such as via the display 29. Alternatively or additionally, the control system 21 may be configured to automatically identify one or more potential docking surfaces around the marine vessel by identifying a linear relationship between a group of proximity measurements 90 located in a particular area. In one example, a potential docking surface 150 is identified based on the multiple proximity measurements 90 having a threshold linear relationship with respect to one another. For example, the potential docking surface 150 may be identified, or represented, as the best fit line based on relevant proximity measurements 90.

In the example at FIG. 4, the marine vessel 10 is approaching a docking surface on the starboard side, and thus multiple proximity measurements 90 align along that side. The closest proximity measurement $90_{+y}$ in the starboard direction may first be located, and then the linear relationship determination made therefrom. In other embodiments, all proximity measurements within a predetermined distance, such as calculated based on the simplified vessel outline 80, may be assessed to detect a linear relationship that represents a potential docking surface.

Figure 5:
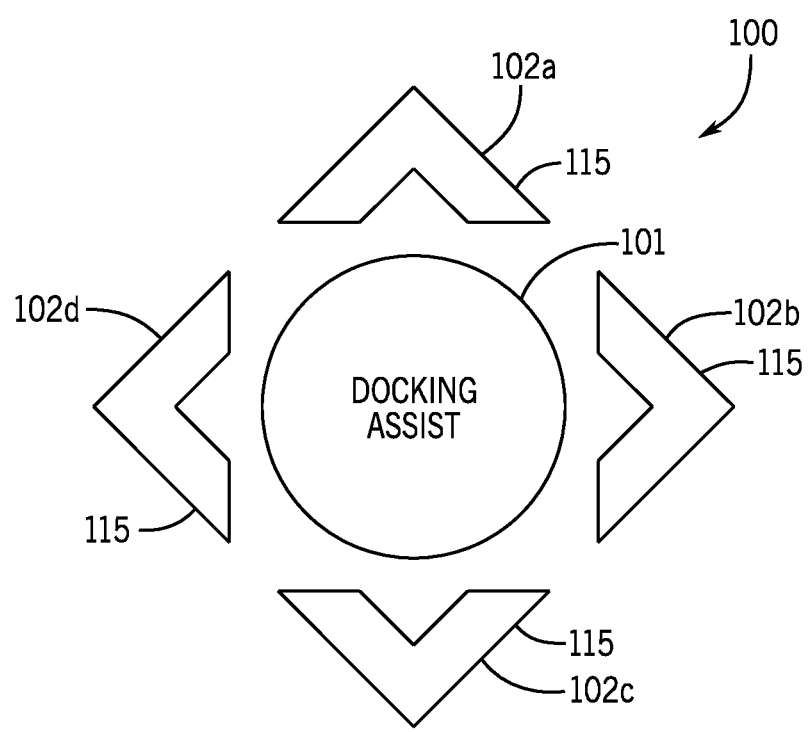
FIG. 5 shows an exemplary user interface in accordance with an embodiment of the present disclosure.

Any of various user interface devices may be configured and utilized to engage the autonomous docking mode, such as the display 29, the keypad 28, and/or the joystick 30. Upon receiving a user input commanding engagement of the autonomous docking mode, or upon the control systems' identification of one or more potential docking surfaces 150 around the marine vessel (which may or may not be prompted by engagement of the autonomous docking mode), a user input device may be controlled to present a user with options to engage autonomous docking with respect to one or more of those potential docking surfaces and/or to request selection from the user regarding which docking surface should be utilized. FIG. 5 exemplifies one potential user interface configured for such purposes, which is merely exemplary, comprising a user input device 100 that in various examples may be implemented as a keypad 28, a joystick 30, a visual representation on a display 29 (such as a touchscreen), or by various user interface means.

In FIG. 5, the exemplary user input device 100 (or user interface on a digital display) configuration, where a center portion 101 of the interface functions to activate and deactivate (on/off) available autonomous or semiautonomous control functionality, such as autonomous docking or autonomous launch, and/or to indicate the control functionality that is available and/or active. The center portion 101 may be, for example, a button, keypad, joystick, or portion of a touchscreen display. A direction indicator display 115 includes direction indicators 102a-102d positioned on each side of the center portion 101 to indicate directions of potential and/or selected docking surfaces 105 and/or to indicate the operation of the control system with respect to certain docking surfaces or to indicate available docking surfaces. In certain embodiments, the direction indicators 102a-102d are configured to illuminate or be highlighted to indicate direction with respect to the marine vessel, such as a direction of a potential or selected docking surface. The direction indicators 102a-102d may also be configured as user input devices, such as keys, buttons, or portions on a touch screen that are pressed to select the docking surface or otherwise input a command. For example, where a direction indicator 102a-102d is illuminated to indicate a direction of a potential docking surface 105, receipt of user input at the key associated with the illuminated direction indicator may be interpreted as a user input to select a docking surface 105 for docking. Alternatively, the user input device 100 may be operated to receive a user input at the center portion 101 with respect to the direction indicators 102a-102d, such as where the center portion 101 is a joystick deflectable toward each of the direction indicators 102a-102d.

Once a user selection is received requesting engagement of the autodocking mode or requesting autonomous docking with respect to a selected docking surface 150—e.g., by receiving a direction selection at the user input device 100—the determination of propulsion sufficiency is executed to assess whether the propulsion response capability of the propulsion system sufficiently exceeds the force and/or frequency of the environmental disturbance such that the requested autonomous docking action can be safely performed. The disclosed propulsion sufficiency assessment may be performed with respect to any or all of the steps involved in autonomous docking to determine whether the propulsion system is capable of performing a requested, or potential, autonomous action based on the environmental disturbances. For example, the sufficiency assessment may be performed in response to a user engaging an autonomous docking mode and may be performed with respect to all located docking surfaces, or may be performed only in response to a user selecting a docking surface. Similarly, the propulsion sufficiency assessment may be performed by the control system 21 before identifying a potential docking surface to a user and providing it as a user input option.

The disturbance vector representing an environmental disturbance impacting the marine vessel is determined, such as based on sensor data on the marine vessel, weather data, and/or tide information, as described above. The disturbance vector is compared to the relevant response capability of the propulsion system 20 to oppose it. In FIG. 4, the disturbance vector 170 is impacting the marine vessel 10 in a west-southwest direction, as shown, where a majority disturbance vector portion 170*a* impacts the vessel on the lateral side and a smaller disturbance vector portion 170*b* pushes on the front of the vessel. Thus, the majority disturbance vector portion 170*a* requires lateral thrust to oppose and the smaller disturbance vector portion 170*b* requires forward thrust to oppose. Since the propulsion system 20 is most restricted in its ability to generate lateral thrust to move the vessel in the sway directions, the majority disturbance vector portion 170*a* pushing laterally on the vessel is the only portion of the disturbance vector 170 that would potentially limit the ability of the control system 21 to dock the vessel. The propulsion response capability of the propulsion system 20 to move the vessel in the relevant direction(s) is then identified, which here is primarily the lateral direction (sway thrust). For example, response capability parameters in each of various propulsion directions may be stored and accessible to the controller 24, as described above.

The sufficiency of propulsion authority determination is then made based on the disturbance vector and propulsion response capability of the propulsion system in the relevant direction(s). For example, the determination may be made by comparing the magnitude of each disturbance vector portion 170*a*, 170*b* with the propulsion response capability to generate an opposing thrust in the direction of each vector portion. Note that the control system may be configured to determine each of a surge, a sway, and a yaw directional component, or portion, of the disturbance vector. If the response capability sufficiently exceeds every disturbance vector portion, such as by a threshold amount, then sufficient propulsion authority is available and the control system 21 can proceed with the requested autonomous action. If the response capability does not sufficiently exceed each disturbance vector portion, or is equal to or less than any disturbance vector portion, then it will be difficult for the control system to effectuate movement of the marine vessel in that direction and the control system may determine that insufficient propulsion authority is available.

In some embodiments, the control system 21 may be configured to identify one or more direction(s) of propulsion required to execute the requested autonomous action, and then make the propulsion sufficiency determination based on a comparison of the direction(s) of propulsion to the disturbance vector or vector portions. Referring to the example in FIG. 4, the control system may determine that at least two directions of propulsion are needed to dock the vessel 10, including a rotation of the vessel in the −yaw direction until the slope 152 between the docking side 95 and the selected docking surface 150 is minimized, such as where the magnitude of the slope is less than a threshold slope representing alignment. Once alignment is reached, propulsion must be controlled to move the marine vessel 10 laterally toward the selected docking surface 150. Thus, the marine vessel is moved in a direction perpendicular to the selected side of the vessel outline 80. In the depicted example, the selected docking surface 150 is the starboard side 95 and thus the marine vessel 10 would be moved laterally in the starboard direction maintaining its parallel alignment with the selected docking surface 150. The disturbance vector portion 170*a* opposes the desired lateral direction of propulsion 153 required to dock the vessel 10 against the dock 150, and thus the sufficiency determination may account for whether the desired lateral motion can be achieved based on a comparison of the lateral direction propulsion response capability to the disturbance vector portion 170*a*.

In the depicted example, moving the vessel in the direction of propulsion to effectuate the requested autonomous docking action requires thrust that opposes the disturbance vector. However, that may not always be the case. In some situations, the disturbance vector may be normal to or in the same direction as the direction of propulsion required to execute the requested autonomous action. In some embodiments, if the requested maneuver does not require effectuating propulsion in a particular direction, then the control system 21 may ignore that direction when making the propulsion sufficiency determination. Thus, where executing the requested autonomous action does not require opposing portions of the disturbance vector, then in some embodiments the propulsion capability with respect to those portions of the disturbance vector may be ignored when determining whether sufficient propulsion authority is available to perform the request autonomous action.

Once it is determined that sufficient propulsion authority exists, the control system 21 will then control the plurality of marine drives 12*a*, 12*b* to effectuate the requested autonomous docking action, including to align the marine vessel 10 with the selected docking surface or surfaces and/or to move the marine vessel toward the docking surface 150 such that it gently impacts the dock. Velocity control is provided for such maneuvers based on the proximity of the docking surface and/or the needed alignment adjustment.

Figure 6:
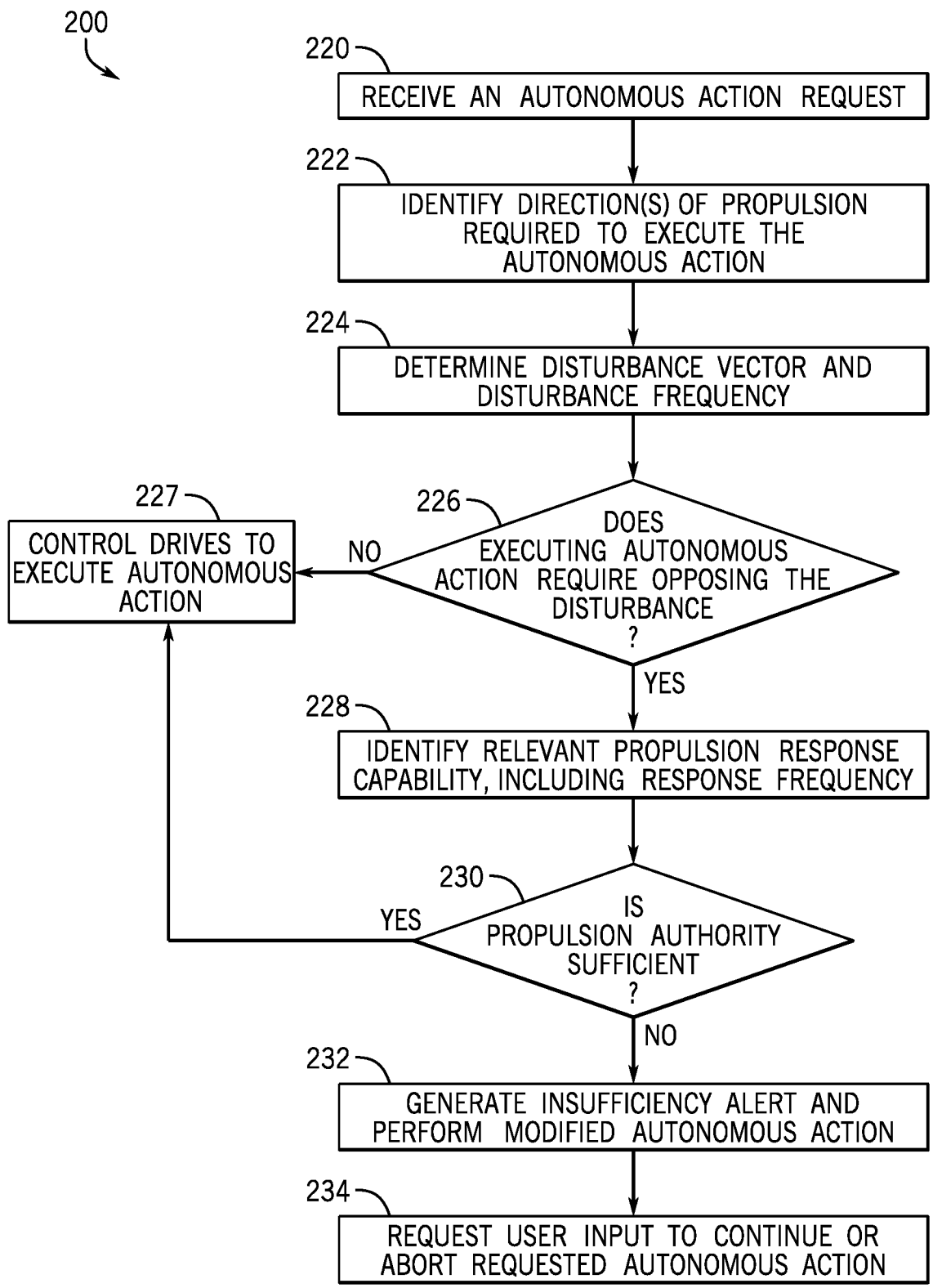
FIGS. 6-7 illustrate additional embodiments of a method for controlling propulsion of a marine vessel according to the present disclosure.

FIG. 6 depicts another propulsion control method 200 that includes exemplary steps for determining whether sufficient propulsion authority is available to execute a requested autonomous action. Upon receipt of a request to execute an autonomous action at step 220, step 222 is executed to identify one or more direction(s) of propulsion required to execute the requested autonomous action. An exemplary determination of the direction of propulsion is described above with respect to the exemplary autonomous docking scenario. In other autonomous situations, the direction of propulsion determination may be based on a set of steps needed to execute the requested action, or it may be based on a general direction that the vessel will need to head to execute the target action, such as a single heading direction.

The disturbance vector is determined at step 224, as is described in detail above. Additionally, a disturbance frequency is determined describing a frequency of the environmental disturbance. The disturbance frequency may describe a periodic event, such as a wave frequency, or may describe a semi-periodic or quasiperiodic event such as shifts in wind. The disturbance frequency may be determined based on on-board sensor measurements, such as based on vessel motion due to waves sensed by the IMU and/or INS, or the like. Note that the force magnitude component of the effect of the waves will be accounted for in the disturbance vector, and may particularly impact the yaw component of the disturbance vector. Depending on the angle that the waves are hitting the vessel, they may impart significant surge, sway, and/or yaw direction forces on the vessel 10. Alternatively or additionally, the disturbance frequency may be based on environmental sensors, such as a wind speed sensor.

Logic is executed at step 226 to determined whether executing the autonomous action requires opposing the environmental disturbance vector. As described above, some embodiments may short-circuit the propulsion sufficiency assessment by only reviewing propulsion sufficiency in directions of propulsion. Where executing the requested autonomous action does not require opposing portions of the disturbance vector, then in some embodiments the propulsion capability with respect to those portions of the disturbance vector may be ignored. Here, if the autonomous action does not require opposing the environmental disturbance vector at step 226, then the system determines that sufficient propulsion authority is available and proceeds to engage the requested autonomous action and control the plurality of marine drives accordingly at step 227. If, on the other hand, the requested autonomous action requires opposing one or more portions of the disturbance vector, then further analysis is required to determine whether sufficient propulsion is available.

The relevant propulsion response capability of the propulsion system 20 is identified at step 228. Here, the propulsion response capability includes a propulsion response frequency. The propulsion response frequency value may be determined and stored, such as along with the propulsion response magnitude, for each of a plurality of directions. The propulsion response frequency is a response time of the propulsion system, and thus how quickly it can effectuate the maximum propulsion response in a particular direction. For example, the propulsion response frequency may account for and include a communication time, a steering response time, a total propulsion response time for effectuating a propulsion command with the plurality of the marine drives 12a, 12b. The communication time indicates how long it takes for a command to be communicated from the controller 24 to the relevant drive and/or steering actuator. The steering response time indicates how long it takes to effectuate the steering response required to effectuate the maximum propulsion response, such as to splay the plurality of drives 12a, 12b. The total propulsion response time indicates how long it takes the plurality of marine drives to effectuate the commanded propulsion output and thus includes, for example, a shift time (e.g., how long it takes to shift the transmission 16a, 16b into the required gear) and a throttle time (e.g., the inertial response time required to get the powerhead 14a, 14b up to the commanded value). The propulsion response frequency may be a preset value, a calibrated value, or may be learned over time as described above.

Logic is then executed at step 230 to determine whether adequate propulsion authority exists to execute the requested autonomous action. For example, the control system 21 may compare the relevant disturbance vector portion(s) and disturbance frequency to the response capability of the propulsion system, including the response capability magnitude and frequency in the direction(s) relevant to the vector portion(s), and particularly to the disturbance vector portion(s) that need to be opposed to perform the requested autonomous action. If the propulsion authority is sufficient, then the autonomous action is executed at step 227. If insufficient propulsion authority exists, then step 232 is executed to generate an insufficiency alter on the user interface to advise the user of the insufficient propulsion authority. The control system may then perform a modified autonomous action, such as automatically switching to a different control mode—e.g., station keeping or object avoidance. Alternatively or additionally, as exemplified at step 234, the modified autonomous action may include controlling the user interface to ask for additional user input, such as to request user input to continue or abort the requested autonomous action in view of the insufficient propulsion authority. For example, the control system 21 may switch to a station keeping or object avoidance mode while asking for user input to continue or abort in view of the insufficiency. Alternatively, the control system 21 may begin executing the requested autonomous action to the extent possible while displaying an insufficiency alert and/or asking for user input to continue or abort in view of the insufficiency. Alternatively, the modified autonomous action may include a different autonomous action than initially requested, such as docking against a different surface than the selected docking surface or rotating the vessel in a different direction to dock against the selected docking surface.

In still other embodiments, the control system may be configured to determine whether the vessel needs to be repositioned and/or moved to a location where the propulsion response capability is sufficient to maintain a position of the marine vessel, such as until user input is provided to take over propulsion control or otherwise adjust the autonomous docking or other autonomous navigation plan. Prior to doing so, the control system may execute further logic for assessing the sufficiency of the propulsion authority, including to determine whether the propulsion system can provide sufficient output to adequately maintain the vessel position against the disturbance. For example, the control system 21 may be configured to determine whether the propulsion response capability in a direction opposite the disturbance vector, such as based on the maximum propulsion output and frequency response of the plurality of marine drives, is at least equal to the magnitude of the disturbance vector and/or the disturbance frequency such that the propulsion system can maintain the vessel position within a threshold distance of GPS position over a predetermined period of time. If the propulsion response capability is insufficient in this respect, then the modified autonomous action may further include controlling the plurality of marine drives to adjust the vessel location and/or heading.

Figure 7:
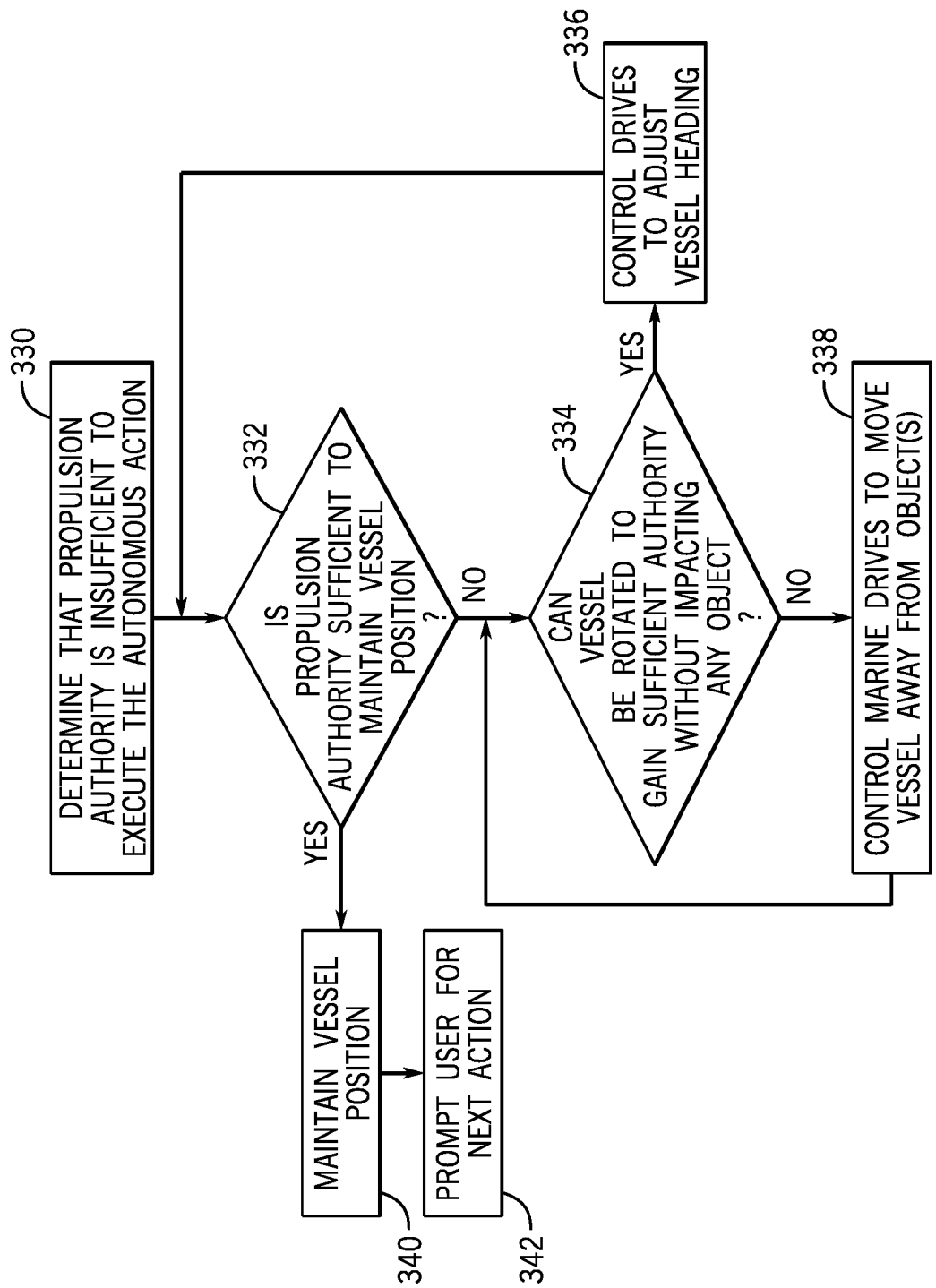

FIG. 7 depicts an exemplary embodiment wherein, upon determining that the propulsion authority is insufficient to execute the autonomous action at step 330, steps are executed to determine whether the propulsion response capability of the vessel is also insufficient to maintain the vessel position. For example, the insufficiency determination at step 330 may follow steps 220 through 230 described above. Logic is then executed at step 332 to determine whether adequate propulsion authority exists to adequately maintain the vessel's current position, such as to avoid the vessel moving position and colliding with an object on or near a path in the direction of the disturbance vector. For example, the control system 21 may compare the relevant disturbance vector portion(s) and disturbance frequency to the response capability of the propulsion system, including the response capability magnitude and frequency in the direction(s) relevant to the vector portion(s), and particularly to the disturbance vector portion(s) that need to be opposed to maintain the marine vessel 10 within a threshold distance range of its current GPS position. In one embodiment, the threshold distance range may be based on a nearest object or objects to the vessel. Alternatively or additionally, the threshold distance assessment may be based on a direction of the disturbance vector with respect to the marine vessel 10—e.g., based on a closest object to the marine vessel in a direction that the disturbance vector is likely to push the marine vessel from its current position. In still another embodiment, the threshold distance range may be based on a preset value, such as within a predetermined radius of the current GPS position of the vessel.

If the propulsion authority is sufficient to maintain the vessel position, then the control system executes step 340 and controls the plurality of marine drives to maintain vessel position, such as switching to station keeping mode. If the propulsion authority is not sufficient to maintain the vessel position at step 332, then logic is executed to reposition the vessel so that the propulsion system can adequately maintain the vessel position. Various logic configurations for repositioning the vessel 10 based on proximity measurements are described herein and may be implemented to adjust the location and/or heading of the vessel such that the propulsion response capability is adequate to maintain vessel position. In this example, logic is executed at step 334 to determine whether the vessel can be rotated (e.g., rotated in place) to gain sufficient propulsion authority without impacting any object. For example, the nearest proximity measurement in the yaw direction may be compared to the yaw adjustment needed to rotate the vessel such that the relevant propulsion capability exceeds (e.g., by a threshold amount) the disturbance vector and/or disturbance frequency. Alternatively, the nearest proximity measurement in the yaw direction may be compared to the yaw adjustment needed to rotate the vessel into alignment with the disturbance vector, such as to point a closest one of the bow or the stern of the vessel toward the disturbance vector.

If the vessel can be rotated to gain sufficient authority at step 334, then the marine drives are controlled to do so at step 336. If not, then logic is executed at step 338 to move the vessel away from all objects around the vessel and wherein the vessel can be rotated to gain sufficient authority. For example, the marine drives may be controlled to move the vessel in a direction clear from all objects currently within a threshold distance of the vessel. For instance, if the vessel has entered a slip for docking but cannot execute the final docking steps and cannot be rotated without risk of impacting an object, there may be nearby objects (the dock and/or other docked vessels) detected on three sides of the marine vessel. In that situation, the vessel is moved in a direction toward the fourth side, the open direction, such that it is moved out of the slip and into a channel between the docks where there is sufficient clearance to make the needed heading adjustment. In one embodiment, the control system 21 is configured to move the vessel to a location that is at least a threshold distance from any object such that the vessel can be rotated and position safely maintained. The logic at steps 334 and 332 are then re-executed to adjust the vessel heading until the vessel can enter station keeping mode at step 340. The control system then generates a prompt, such as via the display 29 or other user interface device at the operation console 22, requesting user for input to take over propulsion control, input a new docking plan, or otherwise command the next action.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A propulsion system for a marine vessel comprising:
    a plurality of marine drives configured to effectuate propulsion on a marine vessel in each of a surge direction, a sway direction, and a yaw direction;
    a control system configured to:
        determine a disturbance vector representing an environmental disturbance on the marine vessel;
        identify a propulsion response capability of the plurality of marine drives to oppose the disturbance vector;
        receive a requested autonomous action;
        determine that insufficient propulsion authority is available to perform the requested autonomous action based on the disturbance vector and the propulsion response capability; and
        generate an insufficiency alert on a user interface to advise a user of the insufficient propulsion authority.

2. The system of claim 1, wherein the disturbance vector includes a force, velocity, and/or acceleration of the environmental disturbance, and wherein the propulsion response capability includes a maximum force, a maximum velocity, and/or a maximum acceleration that the plurality of marine drives can effectuate to move the marine vessel in a direction opposite a direction of at least a portion of the disturbance vector.

3. The system of claim 1, wherein the control system is further configured to control the plurality of marine drives based on a modified autonomous action, wherein the modified autonomous action includes at least one of controlling the plurality of marine drives to maintain a position of the marine vessel, controlling the plurality of marine drives to maintain at least a buffer distance from objects around the marine vessel, controlling the plurality of marine drives to move the marine vessel to a location and/or a heading where the propulsion response capability is sufficient to maintain a position of the marine vessel, and controlling the plurality of marine drives based on the requested autonomous action while displaying the insufficiency alert.

4. The system of claim 1, wherein the control system is further configured to, along with the insufficiency alert, control the user interface to request user input to continue or abort the requested autonomous action.

5. The system of claim 1, wherein the propulsion response capability includes a maximum propulsion output in a direction opposite a direction of at least a portion of the disturbance vector, and wherein determining that insufficient propulsion authority is available is further based on a comparison of the maximum propulsion output and the disturbance vector.

6. The system of claim 1, wherein the control system is further configured to:
    determine a disturbance frequency of the environmental disturbance on the marine vessel;
    identify a propulsion response frequency of the plurality of marine drives; and wherein determining that insufficient propulsion authority is available is further based on a comparison of the disturbance frequency and the propulsion response frequency.

7. The system of claim 6, wherein the propulsion response frequency is based on a steering response time for effectuating a steering command and a total propulsion response time for effectuating a propulsion command with the plurality of marine drives.

8. The system of claim 1, wherein the disturbance vector is a net disturbance vector representing a sum of a plurality environmental disturbances, including wind, current, and/or waves.

9. The system of claim 1, wherein the disturbance vector is based on input from a motion sensor configured to sense motion of the marine vessel, an environmental sensor on the marine vessel configured to sense an environmental force on the marine vessel, weather information, and/or tide information.

10. The system of claim 1, wherein the requested autonomous action is a user input commanding engagement of an autonomous mode.

11. The system of claim 10, wherein the control system is further configured to not engage the commanded autonomous mode and to control the user interface to, along with the insufficiency alert, advise the user that the commanded autonomous mode is not engaged.

12. The system of claim 1, wherein the control system is further configured to:
identify a direction of propulsion required to execute the requested autonomous action; and
wherein determining that insufficient propulsion authority is available is further based on a comparison of the direction of propulsion to a direction of at least a portion of the disturbance vector.

13. The system of claim 12, wherein the requested autonomous action is a command to autonomously control propulsion to dock the marine vessel against a selected docking surface, and wherein the direction of propulsion is a direction of the selected docking surface with respect to the marine vessel.

14. A method of controlling propulsion by a plurality of marine drives on a marine vessel, the method comprising:
determining a disturbance vector representing an environmental disturbance on the marine vessel;
identifying a propulsion response capability of the plurality of marine drives to oppose the disturbance vector;
receiving a requested autonomous action;
determining that insufficient propulsion authority is available to perform the requested autonomous action based on the disturbance vector and the propulsion response capability;
generating an insufficiency alert on a user interface to advise a user of the insufficient propulsion authority; and
controlling the plurality of marine drives based on a modified autonomous action.

15. The method of claim 14, further comprising wherein the disturbance vector includes a force, velocity, and/or acceleration of the environmental disturbance, and wherein the propulsion response capability includes a maximum force, a maximum velocity, and/or a maximum acceleration that the plurality of marine drives can effectuate to move the marine vessel in a direction opposite a direction of a least a portion of the disturbance vector.

16. The method of claim 14, wherein the modified autonomous action includes at least one of controlling the plurality of marine drives to maintain a position of the marine vessel, controlling the plurality of marine drives to maintain at least a buffer distance from objects around the marine vessel, and controlling the plurality of marine drives based on the requested autonomous action while displaying the insufficiency alert.

17. The method of claim 16, wherein the modified autonomous action includes controlling the plurality of marine drives to move the marine vessel to a location and/or a heading where the propulsion response capability is sufficient to maintain the position of the marine vessel.

18. The method of claim 14, wherein the propulsion response capability includes a maximum propulsion output in a direction opposite a direction of at least a portion of the disturbance vector, and wherein determining that insufficient propulsion authority is available is further based on a comparison of the maximum propulsion output and the disturbance vector.

19. The method of claim 14, further comprising:
determining a disturbance frequency of the environmental disturbance on the marine vessel;
identifying a propulsion response frequency of the plurality of marine drives; and
wherein determining that insufficient propulsion authority is available is further based on a comparison of the disturbance frequency and the propulsion response frequency.

20. The method of claim 18, wherein the propulsion response frequency is based on a steering response time for effectuating a steering command and a total propulsion response time for effectuating a propulsion command with the plurality of marine drives.

21. The method of claim 18, wherein the disturbance vector is a net disturbance vector representing a sum of environmental disturbances, including wind, current, and/or waves.

22. The method of claim 14, wherein the requested autonomous action is a user input commanding engagement of an autonomous mode.

23. The method of claim 21, further comprising, upon determining that insufficient propulsion authority is available, not engaging the commanded autonomous mode and controlling the user interface to, along with the insufficiency alert, advise the user that the commanded autonomous mode is not engaged.

24. The method of claim 14, further comprising:
identifying a direction of propulsion required to execute the requested autonomous action; and
wherein determining that insufficient propulsion authority is available is further based on a comparison of the direction of propulsion to a direction of at least a portion of the disturbance vector.

25. The method of claim 23, wherein the requested autonomous action is a command to autonomously control propulsion to dock the marine vessel against a selected docking surface, and wherein the direction of propulsion is a direction of the selected docking surface with respect to the marine vessel.

* * * * *